United States Patent [19]

Mahlein et al.

[11] 4,057,321
[45] Nov. 8, 1977

[54] SPECTROSCOPICALLY SELECTIVE FILTER DEVICE

[75] Inventors: Hans Mahlein; Achim Reichelt, both of Munich, Germany

[73] Assignee: Siemens Aktiengesellschaft, Berlin & Munich, Germany

[21] Appl. No.: 677,448

[22] Filed: Apr. 15, 1976

[30] Foreign Application Priority Data

Apr. 18, 1975 Germany .............................. 2517194

[51] Int. Cl.$^2$ .................................................. G02B 5/14
[52] U.S. Cl. ................................ 350/96 WG; 356/112
[58] Field of Search ................ 350/96 WG; 356/112; 331/94.5 C, 94.5 D, 94.5 H

[56] References Cited

U.S. PATENT DOCUMENTS

| | | | |
|---|---|---|---|
| 3,675,157 | 7/1972 | Kaminow et al. | 331/94.5 C |
| 3,822,929 | 7/1974 | Heidrich et al. | 350/96 WG |
| 3,868,589 | 2/1975 | Wang | 350/96 WG |
| 3,891,302 | 6/1975 | Dabby et al. | 350/96 WG |
| 3,970,959 | 7/1976 | Wang et al. | 350/96 WG |

OTHER PUBLICATIONS

Cheo "Pulse Amplitude Modulation of a $CO_2$ Lasers in an Electro-Optic Thin-Film Waveguide" Appl. Phys. Lett. vol. 22, No. 5, Mar. 1973.

*Primary Examiner*—John K. Corbin
*Assistant Examiner*—Stewart Levy
*Attorney, Agent, or Firm*—Hill, Gross, Simpson, Van Santen, Steadman, Chiara & Simpson

[57] ABSTRACT

A spectroscopically selective filter device for light which is being conveyed in a waveguide disposed on a substrate characterized by at least two Bragg reflectors with distributed feedback which are disposed at spaced given intervals on a surface of the waveguide, a pair of electrodes positioned on opposite surfaces of the waveguide and between each pair of Bragg reflectors, the waveguide in at least the region adjacent the electrodes consisting of electro-optical material and means for applying an electrical voltage on the electrodes to vary the index of refraction of the electro-optical material and to thus adjust the length of the optical path between each pair of reflector. Preferably, each of the reflectors is a grating which is either formed in a surface of the waveguide or in a material disposed on the surface. By applying a voltage of a fixed magnitude, a static filter device is produced, and by applying an alternating voltage, the device will act as an integrated optical scanning-Fabry-Perot-interferometer and modulate the passing light.

9 Claims, 1 Drawing Figure

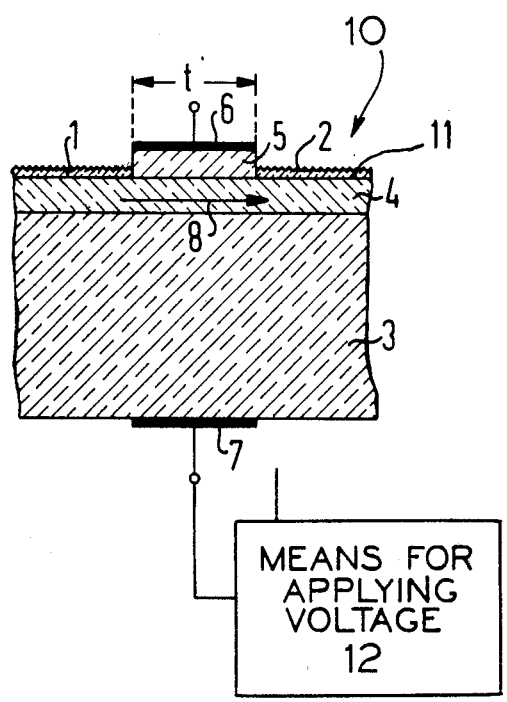

SPECTROSCOPICALLY SELECTIVE FILTER DEVICE

BACKGROUND OF THE INVENTION

1. Field of the Invention

The present invention is directed to a spectroscopically selective filter device for light which is conveyed in a film waveguide arranged on a substrate.

2. Prior Art

Filter devices for light in film waveguides are known. An article by D. C. Flanders, H. Kogelnik, R. V. Schmidt and C. V. Shank, "Grating Filters For Thin-Film Optical Waveguides" *Applied Physics Letters,* Vol. 24, No. 4, Feb. 15, 1974, pages 194–196, describes a grating filter for a film waveguide. In the described device, a surface relief grating is engraved on the surface of the waveguide. If a light wave passes through the waveguide beneath this grating, it is separated into a transmission component and a reflection component in a spectroscopical fashion. However, only a half-value band width of 0.2 nm of filtered light can be obtained by this device.

SUMMARY OF THE INVENTION

The present invention is directed to a spectroscopically selective filter device constructed in integrated technique which device transmits or reflects light having a band width up to a few thousands of a nanometer.

To accomplish these tanks, the spectroscopically selective filter device comprises at least two Bragg reflectors with distributed feedback being disposed on a surface of a film waveguide in a spaced tandem arrangement at given intervals along the direction of light propagation in the film waveguide, a pair of electrodes arranged adjacent opposite surfaces of the film waveguide in a region between each pair of reflectors, said film waveguide in at least the region between the electrodes consisting of electro-optical material, and means connected to the electrodes for applying electrical voltage to the electrodes so that the index of refraction of the electro-optical material is changed to adjust the length of the optical path between each pair of reflectors.

In the most simple embodiment of the invention, the two Bragg reflectors with a distributed feedback coupling are constructed at a fixed distance behind one another on the electro-optical waveguide and the reflectors operate in a manner analogous to a Fabry-Perot arrangement. The length of the optical path between the pair of reflectors, which length has a nominal value which generally cannot be precisely produced during fabrication, may be most satisfactorily adjusted by an application of an electrical voltage to the electrodes. This electrical voltage creates an electrical field in the electro-optical material of the film waveguide which changes the refractive index of the film waveguide and thus changes the length of the optical path between the two reflectors. By adjusting the voltage, the length of the optical path may be precisely adjusted.

Preferably, the Bragg reflectors are reflection gratings formed either directly in the film waveguide or a material which is disposed on the waveguide. When the reflection gratings have a half-value width or half-value breath of 0.2 nm, the filter reaction is intensified if the Fabry-Perot arrangement exhibits several narrow transmission regions within this wavelength region which transmission regions are located between narrow-band reflection regions. Then the transmitted light contains only wavelengths from these narrow spectral regions.

In conformity with a multiple-Fabry-Perot arrangement, a plurality of Bragg reflectors with a distributed feedback may be arranged one behind the other so that the mutual distances are selected in accordance with the characteristic properties of the filter. If the electrical field applied on the electro-optical film waveguide exhibits a fixed magnitude which magnitude is dependent upon the frequency band of the light conveyed to the filter device, the grating constants of the reflection gratings, the distance of the reflection gratings from each other, and the electro-optical material, the device will function as a static filter with a fixed spectral transmission or reflection region. If the electrical field applied to the electro-optical film waveguide is varied, the device may also advantageously be used for modulation of the light waves and act as a dynamic Fabry-Perot-interferometer.

BRIEF DESCRIPTION OF THE DRAWING

The FIGURE is a cross section of an embodiment of the device in accordance with the present invention.

DESCRIPTION OF THE PREFERRED EMBODIMENT

The principles of the present invention are particularly useful in a spectroscopically selective filter generally indicated at 10 in the FIGURE and the filter 10 is provided with only two reflection gratings 1 and 2.

A film waveguide 4 which consists of an elctro-optical material which is lithium niobate is arranged on a glass substrate 3. The two grating reflectors 1 and 2, which are formed in a dielectric material such as glass, are applied on a surface 11 of the film waveguide 4 in a spaced tandem arrangement at a given interval or distance $t$ from one another.

An insulating layer 5 is arranged on the surface 11 of the film waveguide 4 between gratings 1 and 2 and an electrode 6 is disposed on this layer 5. A second or additional electrode 7 is arranged on the substrate 3 opposite the electrode 6. Each of the electrodes 6 and 7 has a terminal which is adapted to be connected to a means 12 for applying a voltage; however, for purposes of illustration, only the terminal for the electrode 7 is illustrated as being connected to the means 12.

A light wave 8 moving in the direction of the arrow is conveyed through the film waveguide 4 from the left to the right and will also run partially in the grating reflectors 1 and 2. The light wave 8 is reflected back and forth in the film waveguide 4 between the gratings 1 and 2. Each of the reflector functions as a Bragg reflector with a distributed feedback. Due to the Bragg scattering, each wave receives light from the wave passing in the opposite direction. A spectroscopic filtering is obtained by means of the spectroscopic sensitivity of the Bragg effect, for example a given structure will only have an energy exchange effect for specific wavelengths of light.

Since the refractive index of the electro-optical material forming the film waveguide 4 will be altered by an electrical field produced by the application of a voltage to the electrodes 6 and 7, the desired value for the length of the optical path of the light waves 8 between the grating reflectors 1 and 2 is achieved by adjusting a voltage applied to the electrodes 6 and 7. For a wavelength in a vacuum $\lambda_0 = 0.88$ μm, an interval $t = 5$ mm, the change $\Delta n$ in the refractive index, which change is necessary for a maximum required change in the length of the optical path by $\lambda_0/2$, is approximately $10^{-4}$. This value may be readily obtained for waveguide films constructed of an electro-optical material such as lithium niobate.

If in the illustrated filter device we assume a peak reflection capability of 0.8 for a reflection grating with a half wave width of the stop band being approximately 0.2 nm, there are several narrow transmission regions in the wavelength regions and narrow band reflection regions are located between the transmission regions. By varying the electrical field applied on the waveguide, it is possible to obtain a fine tuning in a width of 0.2 nm.

In the following, the distance $\Delta\lambda$ of adjacent transmission maxima and their half-value widths $\Delta\lambda \frac{1}{2}$ are approximately calculated for the filter device of the present invention.

For a distance between adjacent transmission maxima, the following equation is valid $\Delta\lambda = \lambda_0^2/2\ nt$. When $t = 5$ mm, $\lambda_0 = 0.88\ \mu$m, and $n = 2.2$, the solving of the above equation produces $\Delta\lambda = 0.036$ nm.

The half-value width of the transmission maximum may be calculated from the relationship $\Delta\lambda\frac{1}{2} = (1 - 9)\lambda 0\ /m\pi\ \sqrt{R}$, wherein $m = 2\ nt/\lambda_0$ and is an integral. With the above mentioned numerical values, and the reflection capability of the grating reflectors being $R = 0.75$, the above equation produces a $\Delta\lambda\frac{1}{2} = 0.003$ nm.

Instead of applying a direct voltage to the electrodes 6 and 7, the applying of an alternating voltage to the electrodes 6 and 7 will cause the filter device to act as the integrated optical scanning Fabry-Perot-interferometer. The Fabry-Perot-interferometer when used in combination with a subsequent stably adjusted, equally narrow band filter, will modulate the light waves being conveyed in the waveguide. If the line width of the beam, which is to be modulated, is smaller than the distance between the two adjacent transmission regions of the filter employed for modulation, the stably adjusted filter may be eliminated.

Although various minor modifications might be suggested by those versed in the art, it should be understood that we wish to employ within the scope of the patent granted hereon, all such modifications as reasonably and properly come within the scope of our contribution to the art.

We claim:

1. A spectroscopically selective filter device for light which is being conveyed in a film waveguide arranged on a substrate, comprising at least two Bragg reflectors with distributed feedback being disposed on a surface of the film waveguide in a spaced tandem arrangement of a given interval along the direction of light propagation in the film waveguide, a pair of electrodes arranged adjacent opposite surfaces of the film waveguide in each region between the two spaced reflectors, said film waveguide in at least the region between the electrodes consisting of an electro-optical material, and means connected to the electrodes for applying an electrical voltage to the electrodes so that the index of refraction of the electrical optical material is changed to adjust the length of the optical path between each pair of reflectors.

2. A spectroscopically selective filter device according to claim 1, wherein the means for applying an electrical voltage applies a voltage of a constant value so that the filter is a static filter.

3. A spectroscopically selective filter device according to claim 1, wherein the means for applying an electrical voltage applies an alternating voltage so that the filter acts as a dynamic Fabry-Perot-interferometer.

4. A spectroscopically selective filter device according to claim 1, wherein each of the Bragg reflectors comprises a grating formed in a surface of the waveguide, each of said gratings filtering light in a spectroscopically selective fashion.

5. A spectroscopically selective filter device according to claim 1, wherein each of the Bragg reflectors comprises a grating arranged on the film waveguide, each of said gratings filtering light in a spectroscopically selective fashion.

6. A spectroscopically selective filter device according to claim 1, wherein the electro-optical material is lithium niobate.

7. A method of spectroscopically filtering light which is being conveyed in a film waveguide arranged on a substrate, said method comprising providing a device comprising a film waveguide arranged on a substrate with at least two Bragg reflectors with distributed feedback on a surface of the film waveguide in a spaced tandem arrangement at a given interval along the direction of light propagation in the waveguide, and a pair of electrodes on opposite surfaces of the waveguide in a region between each pair of reflectors and said film waveguide at least in the region between the electrodes consisting of an elctro-optical material; and controlling the application of an electrical voltage to the electrodes so that the index of refraction of the electro-optical material is changed to adjust the length of the light path between each pair of reflectors.

8. A method according to claim 7, wherein the step of controlling the application of an electric voltage applies a voltage of a constant value so that the filter device operates as a static filter.

9. A method according to claim 7, wherein the step of controlling the application of an electrical voltage applies an alternating voltage to the electrodes so that the device operates as a dynamic Fabry-Perot-interferometer.

* * * * *